June 23, 1936.  G. W. SMITH ET AL  2,044,999
BRAKE SYSTEM
Filed Feb. 21, 1934  2 Sheets-Sheet 1
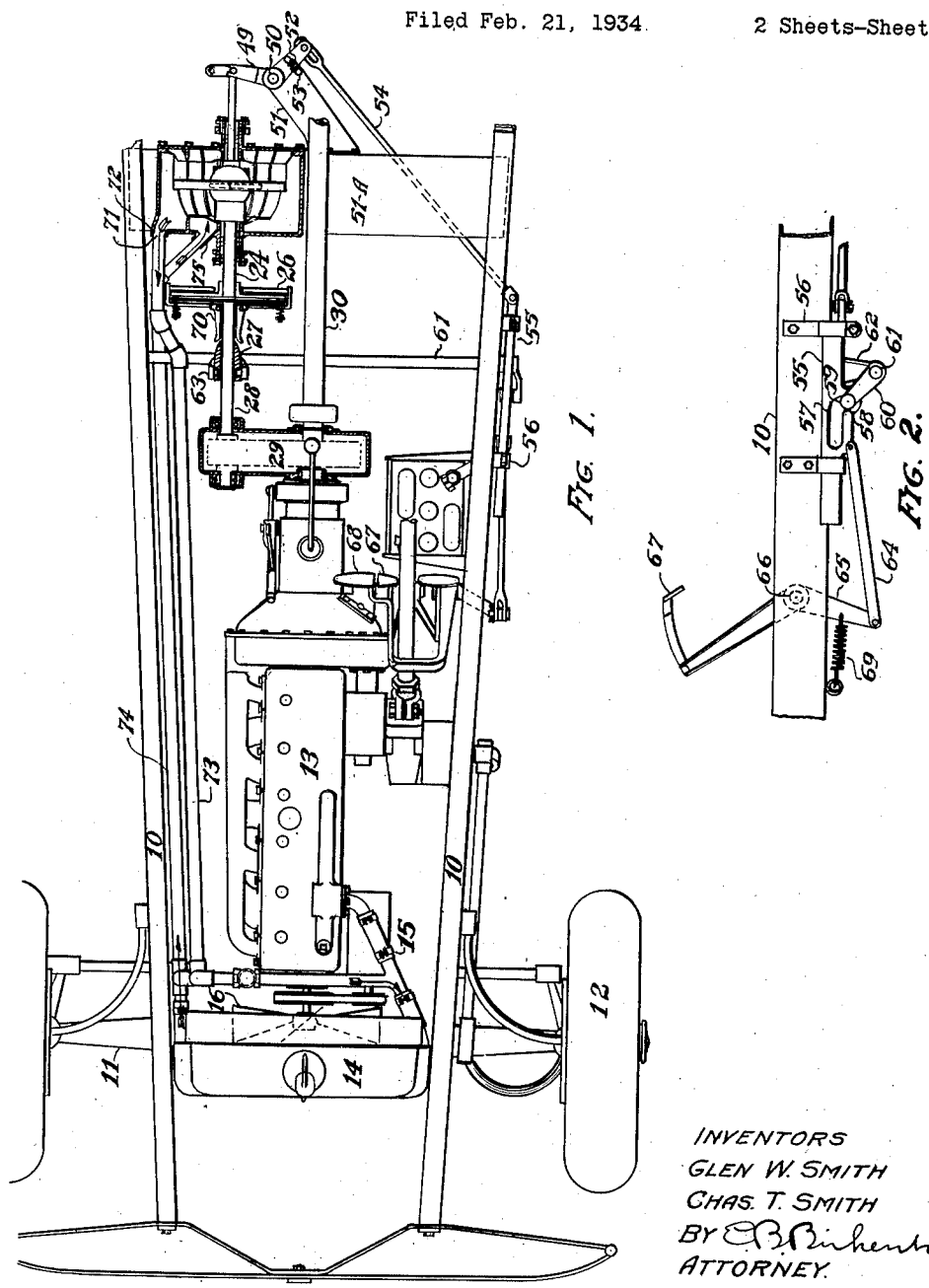
INVENTORS
GLEN W. SMITH
CHAS. T. SMITH
BY
ATTORNEY.

June 23, 1936.  G. W. SMITH ET AL  2,044,999
BRAKE SYSTEM
Filed Feb. 21, 1934   2 Sheets-Sheet 2

INVENTORS
GLEN W. SMITH
CHAS. T. SMITH
BY
ATTORNEY.

Patented June 23, 1936

2,044,999

UNITED STATES PATENT OFFICE 2,044,999

BRAKE SYSTEM

Glen W. Smith and Charles T. Smith,
The Dalles, Oreg.

Application February 21, 1934, Serial No. 712,339

4 Claims. (Cl. 188—90)

This invention relates generally to a brake system and particularly one having a wide field of usefulness ranging from the automotive field to the paper making industry.

The main object of this invention is to provide a unique form of retarding mechanism particularly adapted for use on heavy vehicles, and while it is capable of many various applications it will be illustrated and described in connection with an automobile.

These, and other objects, will become more apparent from the specification following as illustrated in the accompanying drawings, in which:

Fig. 1 is a plan of a portion of a chassis.

Fig. 2 is a fragmentary side elevation showing the pedal mechanism and its attached parts.

Similar numbers of reference refer to similar parts throughout the several views.

Figure 5:
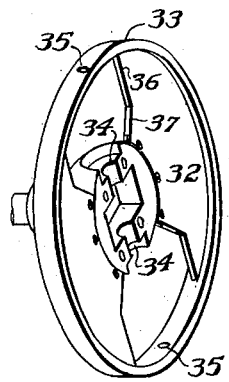
Fig. 5 is a perspective view of the rotor.
Figures 6, 7:
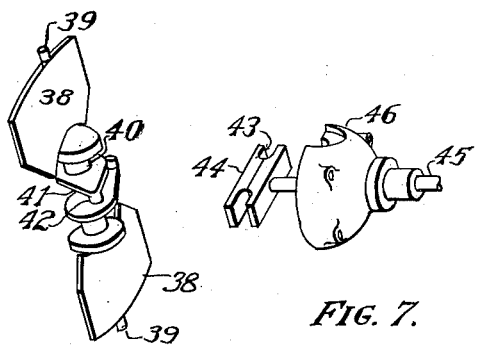
Fig. 6 is a perspective view of the variable pitch propeller.
Fig. 7 is a perspective view showing the yoke for controlling the pitch of the propeller blades.
Figure 4:
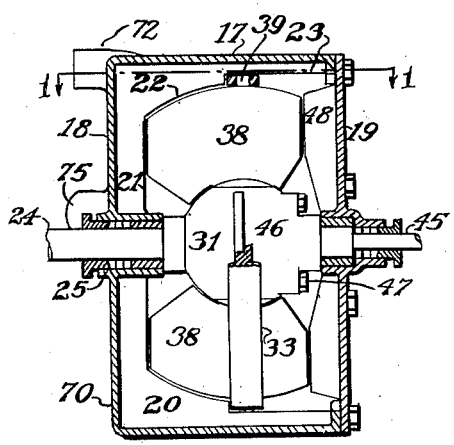
Fig. 4 is a section taken along the line 4—4 in Fig. 3.
Figure 3:
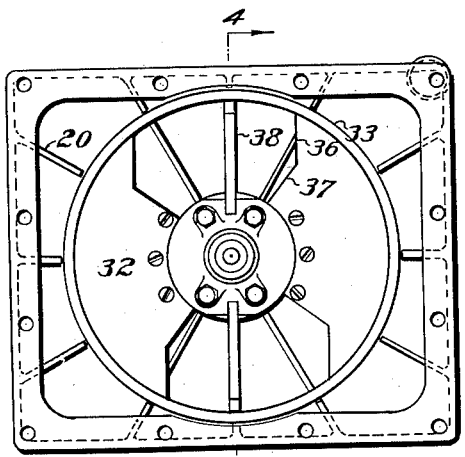
Fig. 3 is an end elevation of the brake element with the cover removed.

Referring in detail to the drawings, there is shown a chassis frame 10 whose forward end is supported on the usual form of front axle 11 on the ends of which are mounted the wheels 12. On the chassis 10 is mounted an engine 13 provided with the usual radiator 14, water line 15 and fan 16.

Referring particularly to the retarding device, same will be seen to include a rectangular casing 17 having a closed end 18 and a removable cover plate 19. The casing 17 is provided with a plurality of radial ribs 20 which are cut away along the lines 21, 22 and 23. The ribs 20 radiate from the axis of the shaft 24 which journals in the stuffing box 25 in the end 18.

The shaft 24 is driven through a disk clutch 26 which is controlled by a cone 27 on the clutch drive shaft 28, to which rotation is supplied by a silent chain 29 which is driven from the main propeller shaft 30, and it is clear that same will cause the shaft 28 to rotate whenever the car is moving along the ground or its driving wheels are rotating.

Secured to the shaft 24 on the inside of the casing 17 is a rotor hub 31 from which project the rotor spokes 32 which support the circular rim 33. In the hub 31 are the bearings 34, which are spaced apart and in alignment with each other and normally intersecting the axis of the shaft 24. The rim 33 is provided with the diametrically opposite holes 35 which are coaxial with the bearings 34. The spokes 32 are cut away along the lines 36 and 37 to receive the propeller blades 38.

Each propeller blade 38 has an outer trunnion 39 which journals in the hole 35, and an inner shaft portion 40 which journals in the bearings 34. Each shaft portion 40 is provided with a crank 41 having a laterally turned crank pin 42. The crank pins 42 engage the slots 43 in the yoke 44 at all times, and the angularity of the blades 38 is controlled by the position of the yoke 44 as determined by the longitudinal position of the rod 45, to which the yoke 44 is attached.

The rod 45 is slidably mounted in the cap 46, which is secured to the hub 31 by means of the bolts 47. It is desirable to provide the cover plate 19 with ribs 48 which correspond with the ribs 20.

The purpose of the ribs 20 and 48 is two-fold, namely, they prevent the fluid contained within the casing 17 from traveling about a circular path without offering much resistance to the rotation of the shaft 28, and also strengthen the casing 17 as well as assist in the conduction of heat away from the point of generation to the exterior of the casing.

The longitudinal position of the rod 45 is determined by a bell crank lever 49 on the rock shaft 50 which is supported by the bracket 51 extending from the same cross member 51-A which supports the casing 17.

The lever 49 is urged by the spring 52 against a stop 53 which will hold the blades 38 in the plane of the spokes 32, unless moved away therefrom. The lever 49 is joined by a slotted rod 54 to a slide 55 which is mounted in the guides 56 attached to the chassis 10. The slide 55 is provided with a longitudinal slot 57 whose rearmost end 58 is downturned and is normally occupied by a roller 59 which is carried by a lever 60 on the rock shaft 61 which journals in the brackets 62.

The shaft 61 has secured thereon a forked clutch operating lever 63 which engages the cone 27. Movement is supplied to the slide 55 by means of the link 64 which is attached to the lever 65 on the shaft 66 of the auxiliary brake pedal 67. The brake pedal 68 and its connections, which correspond to those of the usual foot brake, will not be described in detail. A spring 69 returns the auxiliary brake pedal 67 to a rest position when not being operated.

The operation of the device is as follows: When the automobile is standing still it may be held by its usual emergency or hand brake (not shown) or by the ordinary foot brake 68, but if the vehicle is descending a grade then its propeller shaft 30 is rotating and consequently the shaft 28 is being driven through the chain 29. If it is desired to retard the movement of the vehicle the operator merely depresses the pedal 67 which causes the link 64 to move the slide 55 rearwardly, the first portion of which movement causes the roller 59 to rise out of the rear end of the slot 57, imparting a rocking movement to the lever 60, which results in the clutch cone 27 being moved between the clutch fingers 70 and causing the shaft 24 to be driven. Near the top of the casing 17 is disposed the discharge port 72 and near the shaft 24 is disposed the intake port 75 through which the fluid 71 is drawn from the radiator 14 and driven by the pump vanes 38 out of the discharge port 72 by centrifugal force.

As the operator further depresses the pedal 67, the roller 59 merely slides along in the slot 57 producing no further action at the clutch cone 27 but imparting a sliding movement to the rod 45 which, through the yoke 44, turns the blades 38 away from the plane of the spokes 32, causing same to act against the fluid 71 in the casing 17 and force same by centrifugal action outwardly through the discharge port 72 and pipe 73 to the water line 15 of the radiator 14, from whence it returns by way of the pipe 74 to the inlet 75 of the casing 17.

Obviously, the pumping action thus set up will generate heat, but since the device is used principally on down grades when the cooling unit of the vehicle is not otherwise taxed it follows that the radiator of the automobile can be utilized for water cooling its brakes, and the problem of dissipating the heat from the hydraulic braking mechanism is completely solved. While it might appear that the water from the radiator 14 due to the engine heat would be much hotter than it could be made by the action of the brake in practice, this is not the case, since the generation and dissipation of heat is not instantaneous. For example, if a truck equipped with this device should climb a long grade and the water in the cooling system be heated as a result thereof, then as soon as the truck descended a grade and the operator applied the hydraulic brake, it would of course begin to generate heat. However, it must be remembered that at precisely the same moment the motor has ceased to generate any appreciable quantity of heat so that the cooling action is transferred from the motor to the pump and vice versa.

As previously stated, although the functioning of the device is more readily apparent in connection with automobiles, it has of course numerous other applications to which it is intended to apply.

We claim:

1. A hydraulic braking mechanism comprising a casing having a rotatable shaft journaling in one end thereof and having a variable pitch propeller mounted on said shaft, a rotatable ring supporting the outer ends of the propeller blades, said casing having inturned radial ribs extending from the walls thereof toward the blades of said propeller when in their maximum pitch position, a slidable yoke connected to said blades having an operating rod extending through the pump casing to a point of operation.

2. The device described in claim 1 in combination with a clutch through which said shaft can be driven from the propeller shaft of an automobile, and an auxiliary brake pedal the first portion of whose movement will engage said clutch to cause said propeller to operate and a further movement thereof will produce a variation in the pitch of the propeller blades.

3. A brake system for an automobile having in combination a pump having a selectively controlled variable output, a clutch for driving said pump from the drive wheels of the automobile, conduits for connecting said pump to the radiator of said automobile, a brake pedal having a slotted slide attached thereto and a crank arm engaging the slot in said slide whereby the output of said pump may be varied in a manner that the first portion of the pedal travel will engage the pump clutch and the latter portion of its movement will control the output of said pump.

4. The combination of an automobile having a clutch and clutch operating pedal and having a cooling system with a variable output fluid pumping mechanism operable from the propeller shaft of the automobile, said pumping mechanism including a means operable by the clutch pedal for varying the output of said pumping mechanism from zero to full capacity, means for engaging said clutch prior to the departure of said pumping mechanism from its zero position, and a cooling system for dissipating the heat generated by said pumping mechanism.

GLEN W. SMITH.
CHARLES T. SMITH.